(12) United States Patent
Singh et al.

(10) Patent No.: US 10,932,202 B2
(45) Date of Patent: Feb. 23, 2021

(54) TECHNOLOGIES FOR DYNAMIC MULTI-CORE NETWORK PACKET PROCESSING DISTRIBUTION

(71) Applicant: Intel Corporation, Santa Clara, CA (US)

(72) Inventors: Jasvinder Singh, Shannon (IE); Harry van Haaren, Limerick (IE); Reshma Pattan, Tuam (IE); Radu Nicolau, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/442,094

(22) Filed: Jun. 14, 2019

(65) Prior Publication Data

US 2019/0294570 A1 Sep. 26, 2019

Related U.S. Application Data

(60) Provisional application No. 62/685,318, filed on Jun. 15, 2018.

(51) Int. Cl.
*G06F 13/28* (2006.01)
*G06F 9/54* (2006.01)
*H04L 12/861* (2013.01)
*H04W 28/00* (2009.01)
*H04W 52/24* (2009.01)
(Continued)

(52) U.S. Cl.
CPC .......... *H04W 52/241* (2013.01); *G06F 9/544* (2013.01); *G06F 13/28* (2013.01); *H04B 17/336* (2015.01); *H04L 1/0003* (2013.01); *H04L 1/0031* (2013.01); *H04L 49/9021* (2013.01); *H04W 24/10* (2013.01); *H04W 52/367* (2013.01); *H04W 52/42* (2013.01); *H04W 72/0446* (2013.01); *H04W 72/0473* (2013.01); *H04B 7/0413* (2013.01); *H04L 1/0026* (2013.01)

(58) Field of Classification Search
CPC .......... G06F 13/28; G06F 9/54; H04L 49/90; H04W 28/00
USPC .......................................................... 710/22
See application file for complete search history.

(56) References Cited

U.S. PATENT DOCUMENTS 6,092,155 A * 7/2000 Olnowich ........... G06F 12/0817
711/142
7,620,745 B2 * 11/2009 Kraus ................. H04L 12/5601
710/22

(Continued)

*Primary Examiner* — Christopher B Shin
(74) *Attorney, Agent, or Firm* — Compass IP Law, PC (57) ABSTRACT

Technologies for dynamic multi-core packet processing distribution include a compute device having a distributor core, a direct memory access (DMA) engine, and multiple worker cores. The distributor core writes work data to a distribution buffer. The work data is associated with a packet processing operation. The distributor core may perform a work distribution operation to generate the work data. The work data may be written to a private cache of the distributor core. The distributor core programs the DMA engine to copy the work data from the distribution buffer to a shadow buffer. The DMA engine may copy the work data from one cache line of a shared cache to another cache line of the shared cache. The worker cores access the work data in the shadow buffer. The worker cores may perform the packet processing operation with the work data. Other embodiments are described and claimed.

19 Claims, 5 Drawing Sheets

(51) Int. Cl.
  *H04W 24/10*   (2009.01)
  *H04B 17/336*  (2015.01)
  *H04W 72/04*   (2009.01)
  *H04L 1/00*    (2006.01)
  *H04L 12/883*  (2013.01)
  *H04W 52/36*   (2009.01)
  *H04W 52/42*   (2009.01)
  *H04B 7/0413*  (2017.01)

(56) References Cited

U.S. PATENT DOCUMENTS

| | | | | |
|---|---|---|---|---|
| 8,054,848 | B2* | 11/2011 | Cardona | H04L 49/9042 370/412 |
| 8,935,329 | B2* | 1/2015 | Cardona | H04L 49/9031 709/204 |
| 9,749,266 | B2* | 8/2017 | Steinmacher-Burow | H04L 49/90 |
| 9,916,269 | B1* | 3/2018 | Machulsky | G06F 13/4068 |
| 10,191,865 | B1* | 1/2019 | Machulsky | G06F 13/4282 |
| 2003/0005228 | A1* | 1/2003 | Wong | G06F 12/084 711/121 |
| 2008/0065804 | A1* | 3/2008 | Chinya | G06F 9/4812 710/269 |
| 2017/0289068 | A1* | 10/2017 | Palermo | H04L 49/70 |
| 2018/0173626 | A1* | 6/2018 | Banerjee | G06F 12/0835 |
| 2018/0285105 | A1* | 10/2018 | Wang | G06F 9/30087 |
| 2020/0133868 | A1* | 4/2020 | Kazakov | G06F 17/16 |

* cited by examiner

TECHNOLOGIES FOR DYNAMIC MULTI-CORE NETWORK PACKET PROCESSING DISTRIBUTION

CROSS-REFERENCE TO RELATED APPLICATIONS

The present application claims the benefit of U.S. Provisional Patent Application No. 62/685,318, filed Jun. 15, 2018.

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs one or more processing operations (e.g., security, network address translation (NAT), load-balancing, deep packet inspection (DPI), transmission control protocol (TCP) optimization, caching, Internet Protocol (IP) management, etc.) to determine what the computing device is to do with the network packet (e.g., drop the network packet, process/store at least a portion of the network packet, forward the network packet, etc.). To do so, such packet processing is often performed in a packet-processing pipeline (e.g., a service function chain) where at least a portion of the data of the network packet and/or a reference thereto is passed from one processor core to another as it is processed. Certain high-performance packet processing workloads, such as Intel® Data Plane Development Kit (DPDK) may pass data between cores using in-memory ring buffers. However, during such multi-core packet processing, application performance can be significantly impacted by cross-core communication overhead, which can result in the core responsible for workload distribution becoming the performance bottleneck (e.g., core stalls due to cross-core snoops).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
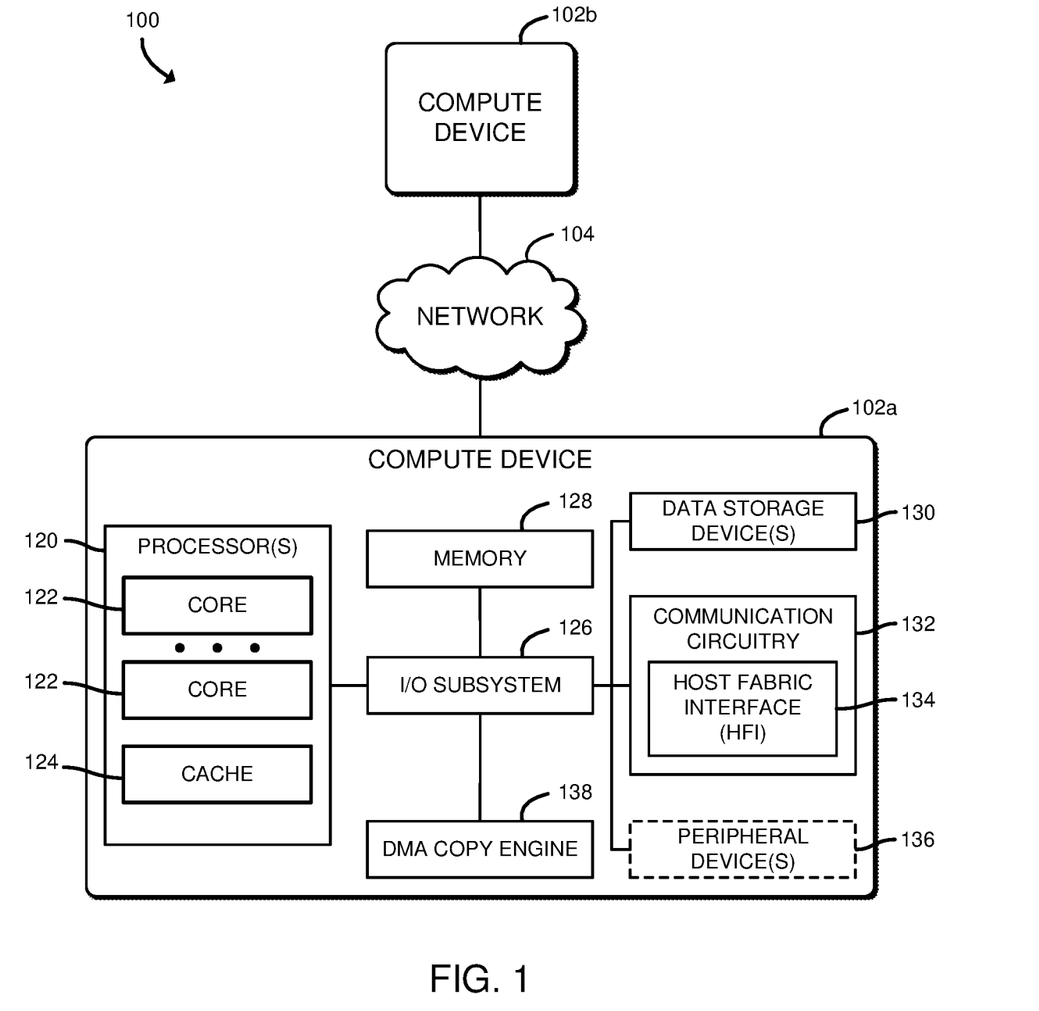
FIG. 1 is a simplified block diagram of at least one embodiment of a system for dynamically distributing network packets across multiple processor cores that includes multiple compute devices communicatively coupled via a network.

Referring now to FIG. 1, in an illustrative embodiment, a system 100 for dynamically distributing network packets across multiple processor cores includes multiple compute devices communicatively coupled via a network 104. While illustratively shown as having two compute devices 102a, 102b, the system 100 may include multiple compute devices 102 in other embodiments. It should be appreciated that the compute device 102b and the compute device 102a are illustratively described herein as being one of a "source" of network traffic (i.e., the source compute device 102b) and a "destination" of the network traffic (i.e., the destination compute device 102a) for the purposes of providing clarity to the description. It should be further appreciated that, in some embodiments, the compute devices 102a, 102b may reside in the same data center or high-performance computing (HPC) environment. In other words, the compute devices 102a, 102b may reside in the same network 104 connected via one or more wired and/or wireless interconnects.

In use, the compute devices 102a, 102b transmit and receive network traffic (e.g., network packets, frames, etc.) to/from each other. For example, the destination compute device 102a may receive a network packet from the source compute device 102b. Upon receiving network traffic, a distributor core (e.g., a designated processor core) performs load balancing or other work distribution operations. The distributor core programs a direct memory access (DMA) engine to copy work data (e.g., packet data or other work data) from a distribution buffer to a shadow buffer, and the DMA engine asynchronously copies the work data. Multiple worker cores access the work data from the shadow buffer. Thus, the system 100 may offload cache contention, cross-core cache snoops, or other cross-core contention overhead from the distributor core to the DMA engine. By removing cross-core overhead from the distributor core, the system 100 may improve performance and scalability for increasing numbers of worker cores. That is, the distributor core may devote additional processor cycles to load balancing or other distribution operations rather than stalling in response to cross-core contention. Additionally, since the distributor core only interacts with the DMA engine, rather than the worker cores and associated ring/queue accesses associated therewith, the cost of cross-core communication from the point of view of the distributor core remains constant as the number of worker cores increases, thereby enabling efficient scaling. Additionally, since network traffic flows are moved between worker cores at runtime, more efficient load balancing can be achieve relative to present, static approaches. It should be further appreciated that the dynamic load-balancing operations described herein can be performed multiple times in a packet-processing pipeline, such that even a single network traffic flow can be load balanced to multiple processors, which should result in more optimal performance relative to present, static load-balancing techniques. In particular, the system 100 may improve uses in applications such as storage acceleration as well as datacenter and telecom application.

Each compute device 102 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart network interface controller (NIC)/HFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, an illustrative compute device 102 includes one or more processors 120, a memory 128, an I/O subsystem 126, one or more data storage devices 130, communication circuitry 132, a DMA engine 138, and, in some embodiments, one or more peripheral devices 136. It should be appreciated that the compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 120 may be embodied as any type of device or collection of devices capable of performing the various compute functions as described herein. In some embodiments, the processor(s) 120 may be embodied as one or more multi-core processors, digital signal processors (DSPs), microcontrollers, or other processor(s) or processing/controlling circuit(s). In some embodiments, the processor(s) 120 may be embodied as, include, or otherwise be coupled to an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein.

The illustrative processor(s) 120 includes multiple processor cores 122 (e.g., two processor cores, four processor cores, eight processor cores, eighteen processor cores, twenty-eight processor cores, etc.) and a cache memory 124. Each of processor cores 122 may be embodied as an independent logical execution unit capable of executing programmed instructions. It should be appreciated that, in some embodiments, the compute device 102 (e.g., in super-computer embodiments) may include thousands of processor cores 122. Each of the processor(s) 120 may be connected to a physical connector, or socket, on a motherboard (not shown) of the compute device 102 that is configured to accept a single physical processor package (i.e., a multi-core physical integrated circuit). Further, each the processor cores 122 is communicatively coupled to at least a portion of the cache memory 124 and functional units usable to independently execute programs, operations, threads, etc.

Figure 2:
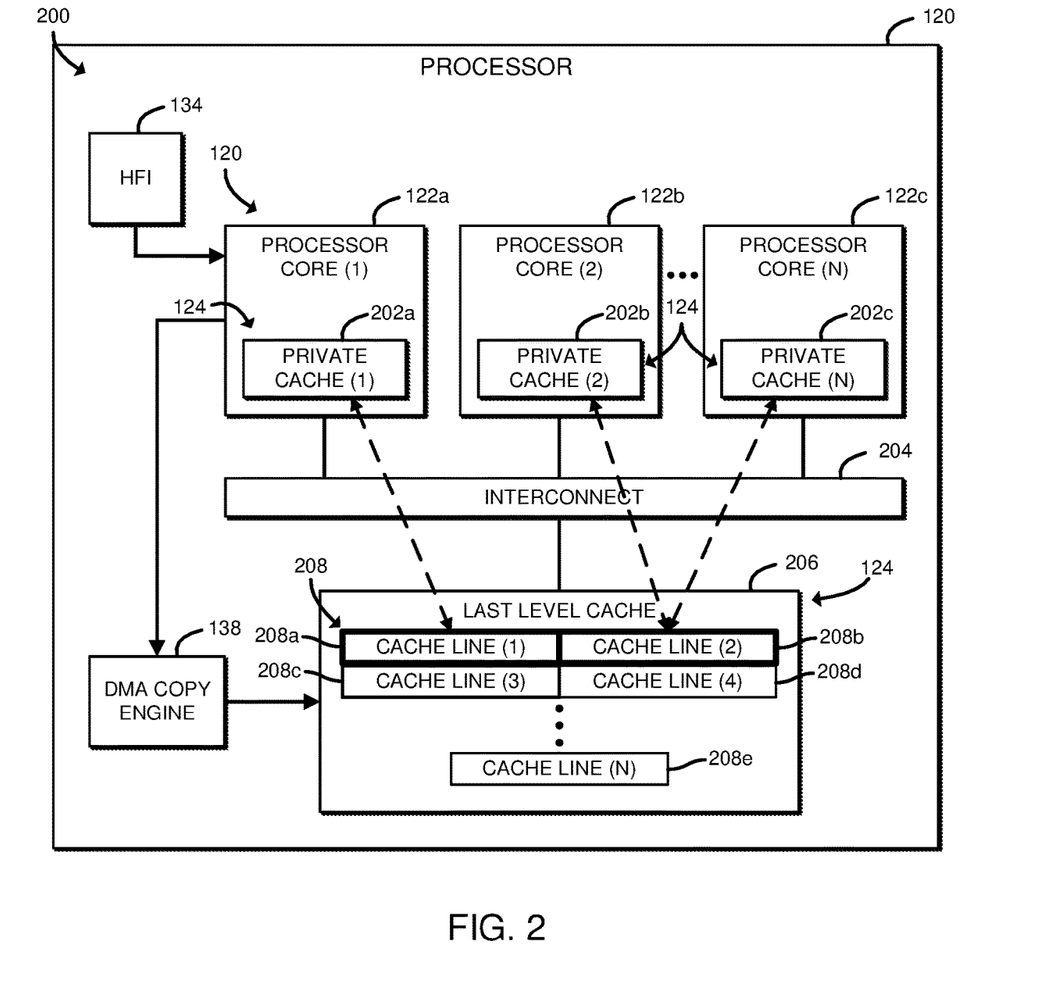
FIG. 2 is a simplified block diagram of at least one embodiment of a processor of a compute device of the system of FIG. 1

The cache memory 124, which may be embodied as any type of cache that the processor(s) 120 can access more quickly than the memory 128 (i.e., main memory), such as an on-die cache, or on-processor cache. In other embodiments, the cache memory 124 may be an off-die cache, but reside on the same system-on-a-chip (SoC) as a processor 120. The illustrative cache memory 124 includes a multi-level cache architecture including one or more private caches each dedicated to a particular one of the processor cores 122 (e.g., L1 and/or L2 cache or other mid-level cache) and a last-level cache (LLC) (e.g., L3 cache). One potential embodiment of a cache architecture is illustrated in FIG. 2 and described further below.

The memory 128 may be embodied as any type of volatile or non-volatile memory or data storage capable of performing the functions described herein. In operation, the memory 128 may store various data and software used during operation of the compute device 102, such as operating systems, applications, programs, libraries, and drivers. It should be appreciated that the memory 128 may be referred to as main memory (i.e., a primary memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

Each of the processor(s) 120 and the memory 128 are communicatively coupled to other components of the compute device 102 via the I/O subsystem 126, which may be embodied as circuitry and/or components to facilitate input/output operations with the processor(s) 120, the memory 128, and other components of the compute device 102. For example, the I/O subsystem 126 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 126 may form a portion of a SoC and be incorporated, along with one or more of the processors 120, the memory 128, and other components of the compute device 102, on a single integrated circuit chip.

The one or more data storage devices 130 may be embodied as any type of storage device(s) configured for short-term or long-term storage of data, such as, for example, memory devices and circuits, memory cards, hard disk drives, solid-state drives, or other data storage devices. Each data storage device 130 may include a system partition that stores data and firmware code for the data storage device 130. Each data storage device 130 may also include an operating system partition that stores data files and executables for an operating system.

The communication circuitry 132 may be embodied as any communication circuit, device, or collection thereof, capable of enabling communications between the compute device 102 and other compute devices 102, as well as any network communication enabling devices, such as an access point, switch, router, etc., to allow communication over the network 104. Accordingly, the communication circuitry 132 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 132 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the compute device 102, etc.), performing computational functions, etc.

In some embodiments, performance of one or more of the functions of communication circuitry 132 as described herein may be performed by specialized circuitry, hardware, or combination thereof of the communication circuitry 132, which may be embodied as a SoC or otherwise form a portion of a SoC of the compute device 102 (e.g., incorporated on a single integrated circuit chip along with one of the processor(s) 120, the memory 128, and/or other components of the compute device 102). Alternatively, in some embodiments, the specialized circuitry, hardware, or combination thereof may be embodied as one or more discrete processing units of the compute device 102, each of which may be capable of performing one or more of the functions described herein.

The illustrative communication circuitry 132 includes a host fabric interface (HFI) 134, which may be embodied as one or more add-in-boards, daughtercards, network interface cards, controller chips, chipsets, or other devices that may be used by the compute device 102 to connect with another compute device 102. In some embodiments, the HFI 134 may be embodied as part of a SoC that includes one or more processors, or included on a multichip package that also contains one or more processors. In some embodiments, the HFI 134 may include a local processor (not shown) and/or a local memory (not shown) that are both local to the HFI 134. In such embodiments, the local processor of the HFI 134 may be capable of performing one or more of the functions of a processor 120 described herein. Additionally or alternatively, in such embodiments, the local memory of the HFI 134 may be integrated into one or more components of the compute device 102 at the board level, socket level, chip level, and/or other levels.

The one or more peripheral devices 136 may include any type of device that is usable to input information into the compute device 102 and/or receive information from the compute device 102. The peripheral devices 136 may be embodied as any auxiliary device usable to input information into the compute device 102, such as a keyboard, a mouse, a microphone, a barcode reader, an image scanner, etc., or output information from the compute device 102, such as a display, a speaker, graphics circuitry, a printer, a projector, etc. It should be appreciated that, in some embodiments, one or more of the peripheral devices 136 may function as both an input device and an output device (e.g., a touchscreen display, a digitizer on top of a display screen, etc.). It should be further appreciated that the types of peripheral devices 136 connected to the compute device 102 may depend on, for example, the type and/or intended use of the compute device 102. Additionally or alternatively, in some embodiments, the peripheral devices 136 may include one or more ports, such as a USB port, for example, for connecting external peripheral devices to the compute device 102.

The DMA engine 138 may be embodied as any DMA copy engine or other type of hardware and/or firmware device that is usable to execute a DMA operation to copy data from one memory location (i.e., virtual or physical memory address) to another memory location. In some embodiments, the DMA copy operation may be performed using the cache memory 124 of the compute device 102, for example by copying a segment/cache line to another segment/cache line in the LLC or other shared cache. It should be appreciated that, depending on the embodiment, the DMA engine 138 may include a driver and/or controller for managing the source/destination address retrieval and the passing of the data being copied via the DMA operations. It should be further appreciated that the DMA engine 138 is purposed to perform contested writes, which could otherwise cause a significant performance degradation in the distributor core (e.g., core stalls due to cross-core communications).

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the compute devices 102a, 102b, which are not shown to preserve clarity of the description.

Referring now to FIG. 2, one potential embodiment of a processor 120 of a compute device 102 is shown. As shown, the illustrative processor 120 includes instances of the processor cores 122, the cache memory 124, the HFI 134, and the DMA engine 138. The illustrative processor cores 122 include a first processor core designated as processor core (1) 122a, a processor core designated as processor core (2) 122b, and a third processor core designated as processor core (N) 122c (i.e., the "Nth" processor core 122, wherein "N" is a positive integer and designates one or more additional processor cores 122). The illustrative processor core (1) 122a is designated as the distributor core, and the illustrative processor core (2) 122b and the processor core (N) 122c are designated as worker cores. Each of the processor cores 122 additionally includes a designated private cache 202, such as an L1 cache, an L2 cache, a mid-level cache, or other cache memory 124 dedicated to the particular processor core 122. As illustratively shown, the processor core (1) 122a includes the private cache (1) 202a, the processor core (2) 122b includes the private (2) 202b, and the processor core (N) 122c includes the private (N) 202c.

As shown, the processor 120 further includes an interconnect 204 and a last-level cache (LLC) 206. The LLC 206 may be embodied as a cache memory 124 that is typically larger than the private caches 202 and shared by all of the processor cores 122 of a processor 120. For example, in an illustrative embodiment, the private cache 202 may be embodied as a level 1 (L1) cache and/or a level 2 (L2) cache, while the LLC 206 may be embodied as a layer 3 (L3) cache. It should be appreciated that, in some embodiments, the multi-level cache architecture may include additional and/or alternative levels of cache memory. While not illustratively shown in FIG. 2, it should be further appreciated that the processor 120 and/or the cache memory 124 may include one or more home agents, one or more cache agents, a memory controller which may be embodied as a controller circuit or other logic that serves as an interface between the processor(s) 120 and the memory 128, or other memory components.

The interconnect 204 may be embodied as any type of ring, mesh, or other interconnect usable to transmit/receive data requests/responses between the processor cores 122 and the last-level cache (LLC) 206. As shown, the illustrative LLC 206 includes multiple LLC cache entries 208. Each cache entry 208 may be embodied as a cache line or other addressable segment of the cache memory 124. The illustrative LLC cache entries 208 include a first LLC cache entry designated as LLC cache entry (1) 208a, a second LLC cache entry designated as LLC cache entry (2) 208b, a third LLC cache entry designated as LLC cache entry (3) 208c, a fourth LLC cache entry designated as LLC cache entry (4) 208d, and a fifth LLC cache entry designated as LLC cache entry (N) 208e (i.e., the "Nth" LLC cache entry 208, wherein "N" is a positive integer and designates one or more additional LLC cache entries 208).

As described previously, the processor core (1) 122a is illustratively designated as the distributor core. Accordingly, the processor core (1) 122a is configured to (e.g., via a distributor thread) query or otherwise receive an indication that work is available to be scheduled for a network packet. Upon receipt, the processor core (1) is configured to save data related to the work in a segment of the LLC 206, such as the cache line (1) 208a. Additionally, upon a determination that work is to be scheduled, the processor core (1) 122a is configured to notify the DMA engine 138, as described herein, to generate a copy of the data upon which the work is to be performed. For example, the work data may be copied from the cache line (1) 208a to the cache line (2) 208b. Accordingly, as described herein and illustratively shown, the processor core (1) 122a has exclusive access to the cache line (1) 208a, while the worker cores (i.e., processor core (2) 122b and processor core (N) 122c) share access to the copy in the cache line (2) 208b.

Figure 3:
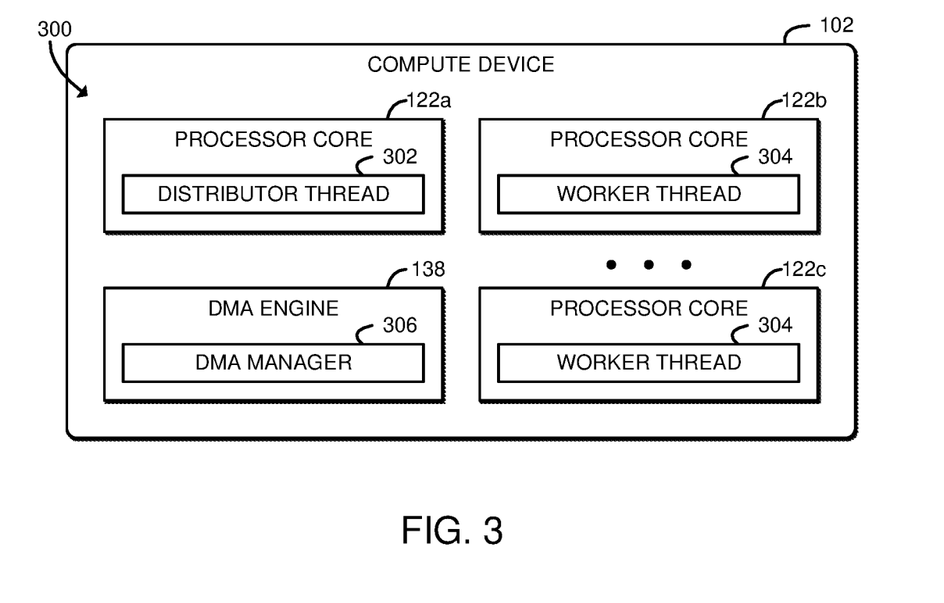
FIG. 3 is a simplified block diagram of at least one embodiment of an environment of the compute device of FIGS. 1 and 2.

Referring now to FIG. 3, in an illustrative embodiment, the compute device 102 establishes an environment 300 during operation. The illustrative environment 300 includes a distributor thread 302, multiple worker threads 304, and a DMA manager 306. As shown, the various components of the environment 300 may be embodied as hardware, firmware, software, or a combination thereof. As such, in some embodiments, one or more of the components of the environment 300 may be embodied as circuitry or collection of electrical devices (e.g., distributor thread circuitry 302, worker thread circuitry 304, and/or DMA manager circuitry 306). It should be appreciated that, in such embodiments, one or more of the distributor thread circuitry 302, the worker thread circuitry 304, and/or the DMA manager circuitry 306 may form a portion of the processor 120 (e.g., one or more processor cores 122), the I/O subsystem 126, the DMA engine 138, and/or other components of the compute device 102. Additionally, in some embodiments, one or more of the illustrative components may form a portion of another component and/or one or more of the illustrative components may be independent of one another.

As shown, the distributor thread 302 may be executed by or otherwise established by the distributor core 122a. The distributor thread 302 is configured to perform one or more work distribution operations to generate work data. The work data is associated with packet processing operations, and may include network packet data received via the HFI 134. The work data may be indicative of one or more worker cores 122 (e.g., the worker cores 122b, 122c, etc.). The distributor thread 302 is configured to write the work data to a distribution buffer. Writing the work data may include writing the work data to a cache line of a private cache 202a of the distributor core 122a. Writing the work data to the cache line may include performing a read-for-ownership operation on the first cache line. The distributor thread 302 is further configured to program the DMA engine 138 to copy the work data from the distribution buffer to a shadow buffer. Programming the DMA engine 138 may include writing one or more DMA descriptors to memory and/or performing a memory-mapped I/O (MMIO) write operation.

The DMA manager 306 is configured to copy the work data from the distribution buffer to the shadow buffer in response to being programmed by the distributor thread 302. Copying the work data from the distribution buffer to the shadow buffer may include transferring the work data from a cache line of the private cache 202a to a cache line 208a of the LLC 206 and copying the work data from the cache line 208a to another cache line 208b of the LLC 206.

As shown, each worker thread 304 may be executed by or otherwise established by a worker core 122b, 122c. Although illustrated with two worker cores 122b, 122c, it should be understood that in some embodiments the compute device 102 may include many more worker cores 122 each executing a worker thread 304. Each worker thread 304 is configured to access the work data in the shadow buffer in response to programming the DMA engine 138 and copying the work data. Each worker thread 304 is further configured to perform one or more packet processing operations in response to accessing the work data. Accessing the work data in the shadow buffer may include transferring the work data from a cache line 208 of the LLC 206 to a cache line of the private cache 202 of the corresponding worker core 122.

Figure 4:
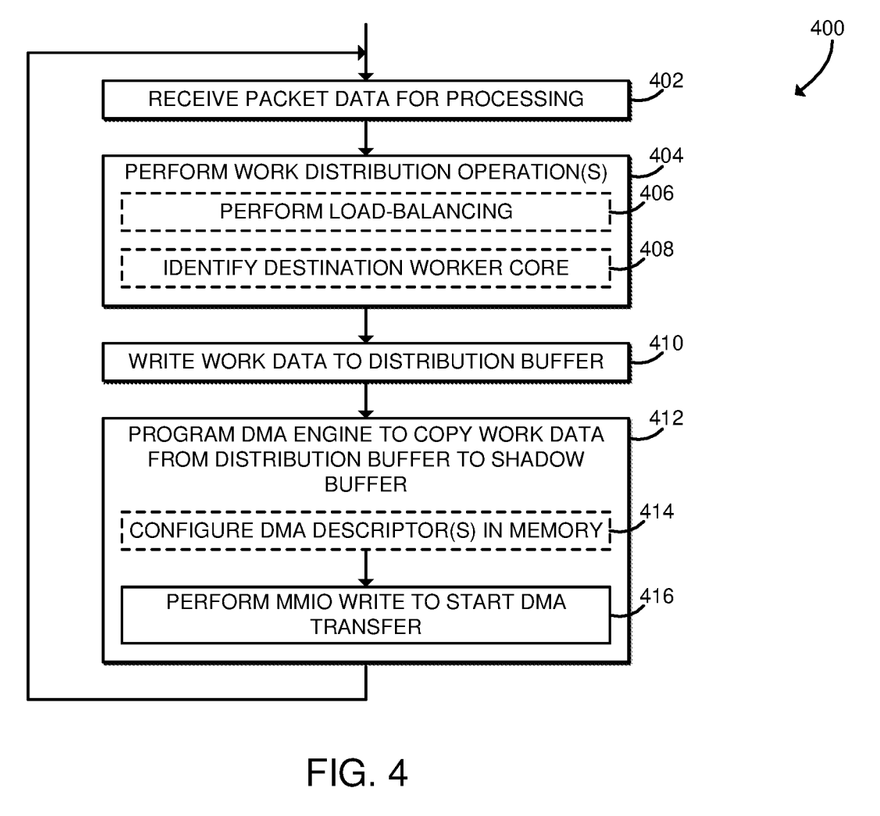
FIG. 4 is a simplified flow diagram of at least one embodiment of a method for the dynamic distribution of network packets across multiple processor cores that may be executed by the compute device of FIGS. 1-3.

Referring now to FIG. 4, a method 400 for the dynamic distribution of network packets across multiple processor cores is shown. It should be appreciated that, in some embodiments, the method 400 may be performed by one or more components of the environment 300 of the compute device 102 as shown in FIG. 3, such as the distributor thread 302. Further, the method 400 may be executed by a processor core 122 of the compute device 102 (e.g., the compute device 102 of FIGS. 1-3) designated to function as a distributor core 122. The method 400 begins with block 402, in which the distributor core 122 receives packet data for processing. The packet data may be received, for example, by the HFI 134 from a remote compute device 102 or otherwise received via packet ingress. As another example, the packet data may be received from a subsequent stage in a packet-processing pipeline (e.g., a service function chain), for example from a worker core 122. Thus, the work distribution operations may be performed multiple times in a packet-processing pipeline.

In block 404, the distributor core 122 performs one or more work distribution operations for the packet data. In some embodiments, in block 406, the distributor core 122 may perform one or more load-balancing operations. For example, the distributor core 122 may balance work among multiple worker cores 122. In some embodiments, in block 408, the distributor core 122 may identify a destination worker core 122 for the packet data.

In block 410, the distributor core 122 writes work data to a distribution buffer. The work data may include or be based on the received packet data. For example, the work data may include packet data received by the HFI 134 or intermediate data received from a subsequent stage in the packet pipeline. Additionally or alternatively, in some embodiments, the work data may include one or more descriptors, pointers, or other data that is indicative of the location of packet data in memory. The work data may identify one or more packet processing operations to be performed by worker cores 122, such as security, network address translation (NAT), load-balancing, deep packet inspection (DPI), transmission control protocol (TCP) optimization, caching, Internet Protocol (IP) management, or other operations in a packet-processing pipeline, such as a service function chain. Further, the work data may identify one or more destination worker cores 122 for processing. For example, the work data may include one or more core identifiers or otherwise associate packet data with the corresponding destination worker core 122. The work data may be organized in any appropriate ring, queue, or other data structure that may be processed by the worker cores 122.

The distributor core 122 may write the work data to the distribution buffer using one or more store instructions that identify the distribution buffer in the main memory 128. Before the work data is written back to main memory 128, the distributor core 122 may write to cache memory 124 of the processor 120. For example, the distributor core 122 may write the work data to the private cache 202 of the distributor core 122 (e.g., L1 or L2 cache of the distributor core 122). As described further below, the distribution buffer is not accessed by the worker cores 122. Thus, the distributor core 122 may write to the distribution buffer without performing cross-core snoops or otherwise stalling based on cross-core contention. For example, the distributor core 122 may write to the private cache 202 by performing a read-for-ownership operation, which does not cause the distributor core 122 to stall. Additionally, because no worker cores 122 are polling the cache line 208 of the distribution buffer for work, prefetching is possible.

In block 412, the distributor core 122 programs the DMA engine 138 to copy the work data from the distribution buffer to a shadow buffer. In response to being programmed, the DMA engine 138 asynchronously performs the copy of the work data. One potential embodiment of a method for copying the work data is described further below in connection with FIG. 5. The distributor core 122 may use any appropriate technique to program the DMA engine 138. In some embodiments, in block 414 the distributor core 122 may configure one or more DMA descriptors in memory to describe the copy operation. The DMA descriptors may, for example, identify a source address (i.e., the distribution buffer), a destination address (i.e., the shadow buffer), and a size of data to copy. In some embodiments, the distributor core 122 may re-use DMA descriptors in order to avoid the overhead associated with writing DMA descriptors. For example, in some embodiments, the same distribution buffer and shadow buffer may be used for multiple copy operations. In those embodiments, the same DMA descriptor may also be re-used for multiple DMA copy operations. For example, the distributor core 122 may initially configure a circular linked list of DMA descriptors that each reference the same distribution buffer and shadow buffer. In that example, the distributor core 122 may not need to update the circular linked list for subsequent transfers. After configuring the DMA descriptors, in block 416 the distributor core 122 performs an MMIO write to cause the DMA engine 138 to start the DMA transfer. For example, the distributor core 122 may update a tail pointer register, a doorbell register, or other register of the DMA engine 138 to cause the DMA engine 138 to perform the DMA copy operation. In some embodiments, the offload cost to the distributor core 122 for starting the DMA copy operation may be single MMIO write operation. After programming the DMA engine 138, the method 400 loops back to block 402 to receive additional packet data for processing.

Figure 5:
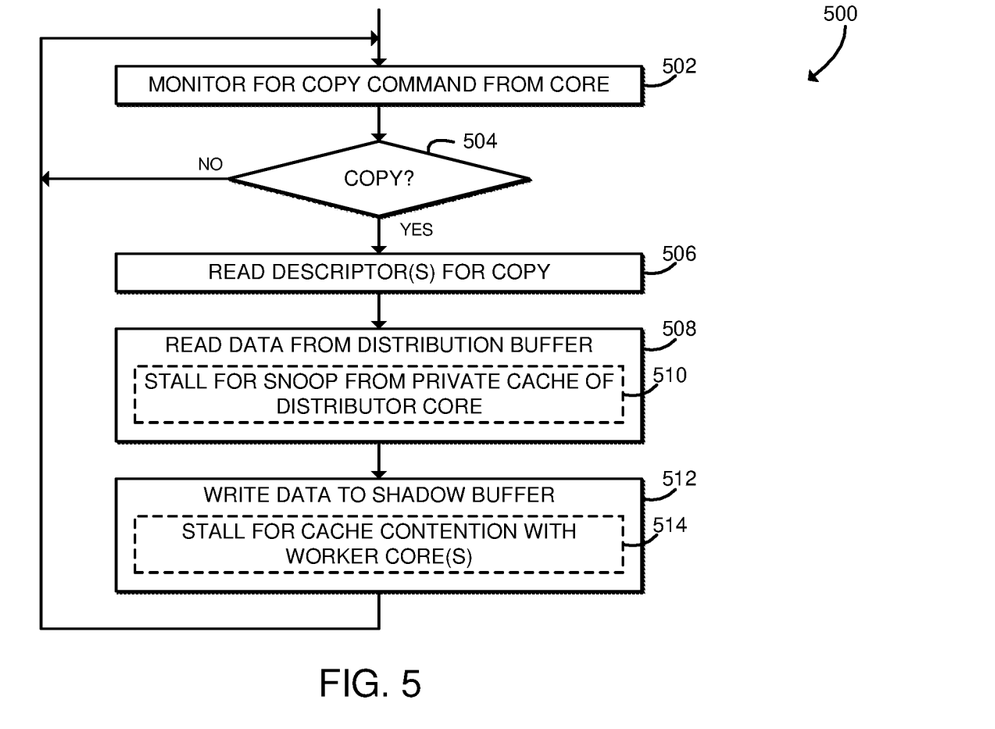
FIG. 5 is a simplified flow diagram of at least one embodiment of a method for copying network packet data with a direct memory access engine that may be executed by the compute device of FIGS. 1-3.

Referring now to FIG. 5, a method 500 for copying network packet data with a direct memory access engine is shown. It should be appreciated that, in some embodiments, the method 500 may be performed by one or more components of the environment 300 of the compute device 102 as shown in FIG. 3, such as the DMA manager 306. Further, the method 500 may be executed by the DMA engine 138 of the compute device 102 (e.g., the compute device 102 of FIGS.

1-3). The method 500 begins with block 502, in which the DMA engine 138 monitors for a copy command from the distributor core 122. For example, as described above, the DMA engine 138 may monitor for MMIO writes to a tail pointer register, doorbell register, or other register of the DMA engine 138. In block 504, the DMA engine 138 determines whether a copy command has been received. If not, the method 500 loops back to block 502 to continue monitoring for copy commands. If a copy command has been received, the method 500 advances to block 506.

In block 506, the DMA engine 138 reads one or more DMA descriptors that describe the copy operation to be performed. For example, the DMA descriptors may identify a source address, a destination address, and a size of data to copy. As described above, the distributor core 122 may configure the DMA descriptor to copy work data from the destination buffer to the shadow buffer. The DMA descriptors may be stored in a ring buffer or other data structure in the main memory 128 or in the cache memory 124 (e.g., in the LLC 206).

In block 508, the DMA engine 138 reads the work data from the distribution buffer. As described above, the distribution buffer may be identified by an address in the main memory 128, but the work data itself may be initially stored in a corresponding cache line of the private cache 202 of the distributor core 122. Reading the work data from the distribution buffer may include transferring the work data from the cache line in the private cache 202 to a corresponding cache line 208 in the LLC 206. In some embodiments, in block 510, the DMA engine 138 may stall for a snoop from the private cache 202 of the distributor core 122. The snoop may be performed according to one or more cache coherence protocols of the processor 120. Note that because the DMA engine 138 operates asynchronously or otherwise independently of the distributor core 122, the distributor core 122 does not stall when the work data is read from the distribution buffer. Accordingly, the distributor core 122 may perform useful scheduling work while the DMA engine 138 stalls. Copying the work data from the private cache 202 to the LLC 206 may pull the cache lines 208 of the distribution buffer into a shared state. As described above, as the cache lines 208 are not written to by the DMA engine 138 or worker cores 122, no remote cache line write-back is required, only a simple "read-for-ownership" from the LLC 206 may be required when the distributor core 122 next writes to the distribution buffer.

In block 512, the DMA engine 138 writes the work data to the shadow buffer. The shadow buffer is also associated with an address in the main memory 128. The work data may be written by the DMA engine 138 to a corresponding cache line 208 in the LLC 206. The distribution buffer and the shadow buffer are stored in different cache lines 208. For example, as illustrated in FIG. 2, the distribution buffer may be stored in the cache line (1) 208a, and the shadow buffer may be stored in cache line (2) 208b. In some embodiments, in block 514, the DMA engine 138 may stall for cache contention with one or more worker cores 122. As described further below, each worker core 122 may perform read accesses to the shadow buffer. Thus, the DMA engine 138 may stall when writing according to one or more cache coherence protocols of the processor 120. Although the DMA engine 138 experiences contention with the worker cores 122, note that the distributor core 122 does not access the shadow buffer and thus does not experience cross-core contention with the worker cores. After writing the work data to the shadow buffer, the work data may be processed by the worker cores 122. One potential embodiment of a method for reading and/or processing work data in the shadow buffer is described below in connection with FIG. 6. After writing the work data, the method 500 loops back to block 502 to continue monitoring for copy commands from the distributor core 122.

Figure 6:
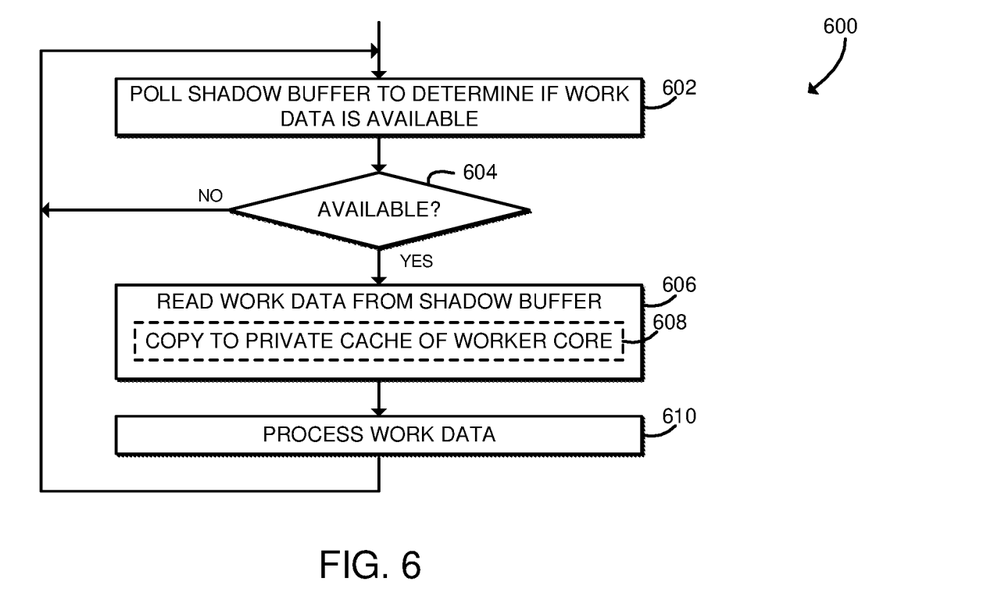
FIG. 6 is a simplified flow diagram of at least one embodiment of a method for processing network packets that may be executed by the compute device of FIGS. 1-3.

Referring now to FIG. 6, a method 600 for processing network packets my multiple worker cores is shown. It should be appreciated that, in some embodiments, the method 600 may be performed by one or more components of the environment 300 of the compute device 102 as shown in FIG. 3, such as a worker thread 304. Further, the method 600 may be executed by a processor core 122 of the compute device 102 (e.g., the compute device 102 of FIGS. 1-3) designated to function as a worker core 122. Additionally, multiple instances of the method 600 may be executed in parallel by multiple worker cores 122. The method 600 begins with block 602, in which the worker core 122 polls the shadow buffer to determine if work data is available. The worker core 122 may use any technique to read or otherwise evaluate the contents of the shadow buffer to determine if work data is available. In block 604, the worker core 122 determines whether work data is available. If not, the method 600 loops back to block 602 to continue polling the shadow buffer. If the work data is available, the method 600 advances to block 606.

In block 606, the worker core 122 reads the work data from the shadow buffer. The worker core 122 may, for example, read the work data using one or more load instructions that identify the shadow buffer in the main memory 128. As described above, the shadow buffer may be identified by an address in the main memory 128, but the work data may be stored by the DMA engine 138 in a cache line 208 in the LLC 206. Thus, in some embodiments, in block 608 the worker core 122 may copy the work data from the from the cache line 208 of the LLC 206 to a private cache 202 of the worker core 122. In so doing, the worker core 122 may cause or experience cache contention with the DMA engine 138.

In block 610, the worker core 122 processes the work data. The worker core 122 may, for example, identify part or all of the work data to process based on a core identifier associated with the worker core 122 or other identifier included in the work data. The worker core 122 may perform one or more packet processing operations, such as security, NAT, load-balancing, DPI, TCP optimization, caching, IP management, or other operations. After processing the work data, the method 600 loops back to block 602 to continue polling the shadow buffer. In some embodiments, the packet processing operation performed by the worker core 122 may use substantially more processor cycles as compared to polling the shadow buffer and reading the work data. Thus, any cross-core contention experienced by the worker core 122 may be small relative to the amount of processing performed on the work data.

EXAMPLES

Illustrative examples of the technologies disclosed herein are provided below. An embodiment of the technologies may include any one or more, and any combination of, the examples described below.

Example 1 includes a compute device for network packet processing, the compute device comprising a distributor thread to (i) write, by a first processor core of the compute device, work data to a distribution buffer, wherein the work data is associated with a packet processing operation; and (ii) program, by the first processor core, a direct memory access engine of the compute device to copy the work data from the distribution buffer to a shadow buffer in response to a write of the work data; and a first worker thread to access, by a second processor core of the compute device, the work data in the shadow buffer in response to programming of the direct memory access engine.

Example 2 includes the subject matter of Example 1, and wherein the first worker thread is further to perform, by the second processor core, the packet processing operation in response to an access of the work data.

Example 3 includes the subject matter of any of Examples 1 and 2, and wherein the distributor thread is further to receive network packet data via a host fabric interface; and to write the work data to the distribution buffer comprises to write the work data based on the network packet data in response to receipt of the network packet data.

Example 4 includes the subject matter of any of Examples 1-3, and wherein the distributor thread is further to perform, by the first processor core of the compute device, a work distribution operation to generate the work data, wherein the work data is indicative of the second processor core; and to write the work data comprises to write the work data in response to performance of the work distribution operation.

Example 5 includes the subject matter of any of Examples 1-4, and further including a second worker thread to access, by a third processor core of the compute device, the work data in the shadow buffer in response to the programming of the direct memory access engine.

Example 6 includes the subject matter of any of Examples 1-5, and wherein the direct memory access engine is to copy the work data from the distribution buffer to the shadow buffer in response to the programming of the direct memory access engine; and to access the work data in the shadow buffer further comprises to access the work data in response to copying of the work data.

Example 7 includes the subject matter of any of Examples 1-6, and wherein to copy the work data from the distribution buffer to the shadow buffer comprises to copy the work data from a first cache line of a shared cache to a second cache line of the shared cache, wherein the shared cache is shared by the first processor core and the second processor core.

Example 8 includes the subject matter of any of Examples 1-7, and wherein to write the work data to the distribution buffer comprises to write a first cache line of a first private cache of the first processor core; to copy the work data from the distribution buffer to the shadow buffer further comprises to transfer the work data from the first cache line of the first private cache to the first cache line of the shared cache, wherein the shared cache comprises a last-level cache; and to access the work data in the shadow buffer comprises to transfer the work data from the second cache line of the shared cache to a second cache line of a private cache of the second processor core.

Example 9 includes the subject matter of any of Examples 1-8, and wherein to write the work data to the first cache line comprises to perform a read-for-ownership operation on the first cache line.

Example 10 includes the subject matter of any of Examples 1-9, and wherein to program the direct memory access engine comprises to perform a memory-mapped I/O write operation.

Example 11 includes the subject matter of any of Examples 1-10, and wherein to program the direct memory access engine further comprises to write a descriptor to memory, wherein the descriptor is indicative of the distribution buffer and the shadow buffer.

Example 12 includes a method for network packet processing, the method comprising writing, by a first processor core of a compute device, work data to a distribution buffer, wherein the work data is associated with a packet processing operation; programming, by the first processor core, a direct memory access engine of the compute device to copy the work data from the distribution buffer to a shadow buffer in response to writing the work data; and accessing, by a second processor core of the compute device, the work data in the shadow buffer in response to programming the direct memory access engine.

Example 13 includes the subject matter of Example 12, and further including performing, by the second processor core, the packet processing operation in response to accessing the work data.

Example 14 includes the subject matter of any of Examples 12 and 13, and further including receiving, by the compute device, network packet data via a host fabric interface; wherein writing the work data to the distribution buffer comprises writing the work data based on the network packet data in response to receiving the network packet data.

Example 15 includes the subject matter of any of Examples 12-14, and further including performing, by the first processor core, a work distribution operation to generate the work data, wherein the work data is indicative of the second processor core; wherein writing the work data comprises writing the work data in response to performing the work distribution operation.

Example 16 includes the subject matter of any of Examples 12-15, and further including accessing, by a third processor core of the compute device, the work data in the shadow buffer in response to programming the direct memory access engine.

Example 17 includes the subject matter of any of Examples 12-16, and further including copying, by the direct memory access engine, the work data from the distribution buffer to the shadow buffer in response to programming the direct memory access engine; wherein accessing the work data in the shadow buffer further comprises accessing the work data in response to copying the work data.

Example 18 includes the subject matter of any of Examples 12-17, and wherein copying the work data from the distribution buffer to the shadow buffer comprises copying the work data from a first cache line of a shared cache to a second cache line of the shared cache, wherein the shared cache is shared by the first processor core and the second processor core.

Example 19 includes the subject matter of any of Examples 12-18, and wherein writing the work data to the distribution buffer comprises writing a first cache line of a first private cache of the first processor core; copying the work data from the distribution buffer to the shadow buffer further comprises transferring the work data from the first cache line of the first private cache to the first cache line of the shared cache, wherein the shared cache comprises a last-level cache; and accessing the work data in the shadow buffer comprises transferring the work data from the second cache line of the shared cache to a second cache line of a private cache of the second processor core.

Example 20 includes the subject matter of any of Examples 12-19, and wherein writing the work data to the first cache line comprises performing a read-for-ownership operation on the first cache line.

Example 21 includes the subject matter of any of Examples 12-20, and wherein programming the direct memory access engine comprises performing a memory-mapped I/O write operation.

Example 22 includes the subject matter of any of Examples 12-21, and wherein programming the direct memory access engine further comprises writing a descriptor to memory, wherein the descriptor is indicative of the distribution buffer and the shadow buffer.

Example 23 includes a computing device comprising a processor; and a memory having stored therein a plurality of instructions that when executed by the processor cause the computing device to perform the method of any of Examples 12-22.

Example 24 includes one or more non-transitory, computer readable storage media comprising a plurality of instructions stored thereon that in response to being executed result in a computing device performing the method of any of Examples 12-22.

Example 25 includes a computing device comprising means for performing the method of any of Examples 12-22.

The invention claimed is:

1. A compute device for network packet processing, the compute device comprising:
 a distributor thread to (i) write, by a first processor core of the compute device, work data to a distribution buffer, wherein the work data is associated with a packet processing operation; and (ii) program, by the first processor core, a direct memory access engine of the compute device to copy the work data from the distribution buffer to a shadow buffer in response to a write of the work data; and
 a first worker thread to access, by a second processor core of the compute device, the work data in the shadow buffer in response to the program of the direct memory access engine;
 wherein the direct memory access engine is to copy the work data from the distribution buffer to the shadow buffer in response to the programming of the direct memory access engine, and wherein to copy the work data from the distribution buffer to the shadow buffer comprises to copy the work data from a first cache line of a shared cache to a second cache line of the shared cache, wherein the shared cache is shared by the first processor core and the second processor core; and
 wherein to access the work data in the shadow buffer further comprises to access the work data in response to copying of the work data.

2. The compute device of claim 1, wherein the first worker thread is further to perform, by the second processor core, the packet processing operation in response to an access of the work data.

3. The compute device of claim 1, wherein:
 the distributor thread is further to receive network packet data via a host fabric interface; and
 to write the work data to the distribution buffer comprises to write the work data based on the network packet data in response to receipt of the network packet data.

4. The compute device of claim 1, wherein:
 the distributor thread is further to perform, by the first processor core of the compute device, a work distribution operation to generate the work data, wherein the work data is indicative of the second processor core; and
 to write the work data comprises to write the work data in response to performance of the work distribution operation.

5. The compute device of claim 1, further comprising a second worker thread to access, by a third processor core of the compute device, the work data in the shadow buffer in response to the program of the direct memory access engine.

6. The compute device of claim 1, wherein:
 to write the work data to the distribution buffer comprises to write a first cache line of a first private cache of the first processor core;
 to copy the work data from the distribution buffer to the shadow buffer further comprises to transfer the work data from the first cache line of the first private cache to the first cache line of the shared cache, wherein the shared cache comprises a last-level cache; and
 to access the work data in the shadow buffer comprises to transfer the work data from the second cache line of the shared cache to a second cache line of a private cache of the second processor core.

7. The compute device of claim 6, wherein to write the work data to the first cache line comprises to perform a read-for-ownership operation on the first cache line.

8. The compute device of claim 1, wherein to program the direct memory access engine comprises to perform a memory-mapped I/O write operation.

9. The compute device of claim 8, wherein to program the direct memory access engine further comprises to write a descriptor to memory, wherein the descriptor is indicative of the distribution buffer and the shadow buffer.

10. A method for network packet processing, the method comprising:
 writing, by a first processor core of a compute device, work data to a distribution buffer, wherein the work data is associated with a packet processing operation;
 programming, by the first processor core, a direct memory access engine of the compute device to copy the work data from the distribution buffer to a shadow buffer in response to writing the work data;
 copying, by the direct memory access engine, the work data from the distribution buffer to the shadow buffer in response to programming the direct memory access engine, wherein copying the work data from the distribution buffer to the shadow buffer comprises copying the work data from a first cache line of a shared cache to a second cache line of the shared cache, wherein the shared cache is shared by the first processor core and a second processor core; and
 accessing, by the second processor core of the compute device, the work data in the shadow buffer in response to programming the direct memory access engine and in response to copying the work data.

11. The method of claim 10, further comprising:
 performing, by the first processor core, a work distribution operation to generate the work data, wherein the work data is indicative of the second processor core and writing the work data comprises writing the work data in response to performing the work distribution operation.

12. The method of claim 10, further comprising accessing, by a third processor core of the compute device, the work data in the shadow buffer in response to programming the direct memory access engine.

13. The method of claim 10, wherein:
 writing the work data to the distribution buffer comprises writing a first cache line of a first private cache of the first processor core;
 copying the work data from the distribution buffer to the shadow buffer further comprises transferring the work data from the first cache line of the first private cache to the first cache line of the shared cache, wherein the shared cache comprises a last-level cache; and accessing the work data in the shadow buffer comprises transferring the work data from the second cache line of the shared cache to a second cache line of a private cache of the second processor core.

14. The method of claim 10, wherein programming the direct memory access engine comprises performing a memory-mapped I/O write operation.

15. One or more computer-readable storage media comprising a plurality of instructions stored thereon that, in response to being executed, cause a compute device to:

write, by a first processor core of the compute device, work data to a distribution buffer, wherein the work data is associated with a packet processing operation;

program, by the first processor core, a direct memory access engine of the compute device to copy the work data from the distribution buffer to a shadow buffer in response to writing the work data;

copy, by the direct memory access engine, the work data from the distribution buffer to the shadow buffer in response to programming the direct memory access engine, wherein to copy the work data from the distribution buffer to the shadow buffer comprises to copy the work data from a first cache line of a shared cache to a second cache line of the shared cache, wherein the shared cache is shared by the first processor core and a second processor core; and access, by the second processor core of the compute device, the work data in the shadow buffer in response to programming the direct memory access engine and in response to copying the work data.

16. The one or more computer-readable storage media of claim 15, further comprising a plurality of instructions stored thereon that, in response to being executed, cause the compute device to:

perform, by the first processor core, a work distribution operation to generate the work data, wherein the work data is indicative of the second processor core and to write the work data comprises to write the work data in response to performing the work distribution operation.

17. The one or more computer-readable storage media of claim 15, further comprising a plurality of instructions stored thereon that, in response to being executed, cause the compute device to access, by a third processor core of the compute device, the work data in the shadow buffer in response to programming the direct memory access engine.

18. The one or more computer-readable storage media of claim 15, wherein:

to write the work data to the distribution buffer comprises to write a first cache line of a first private cache of the first processor core;

to copy the work data from the distribution buffer to the shadow buffer further comprises to transfer the work data from the first cache line of the first private cache to the first cache line of the shared cache, wherein the shared cache comprises a last-level cache; and to access the work data in the shadow buffer comprises to transfer the work data from the second cache line of the shared cache to a second cache line of a private cache of the second processor core.

19. The one or more computer-readable storage media of claim 15, wherein to program the direct memory access engine comprises to perform a memory-mapped I/O write operation.

* * * * *